W. GILLETT.
APPARATUS FOR MEASURING AND SORTING RODS.
APPLICATION FILED SEPT. 2, 1916.
1,344,941.
Patented June 29, 1920.
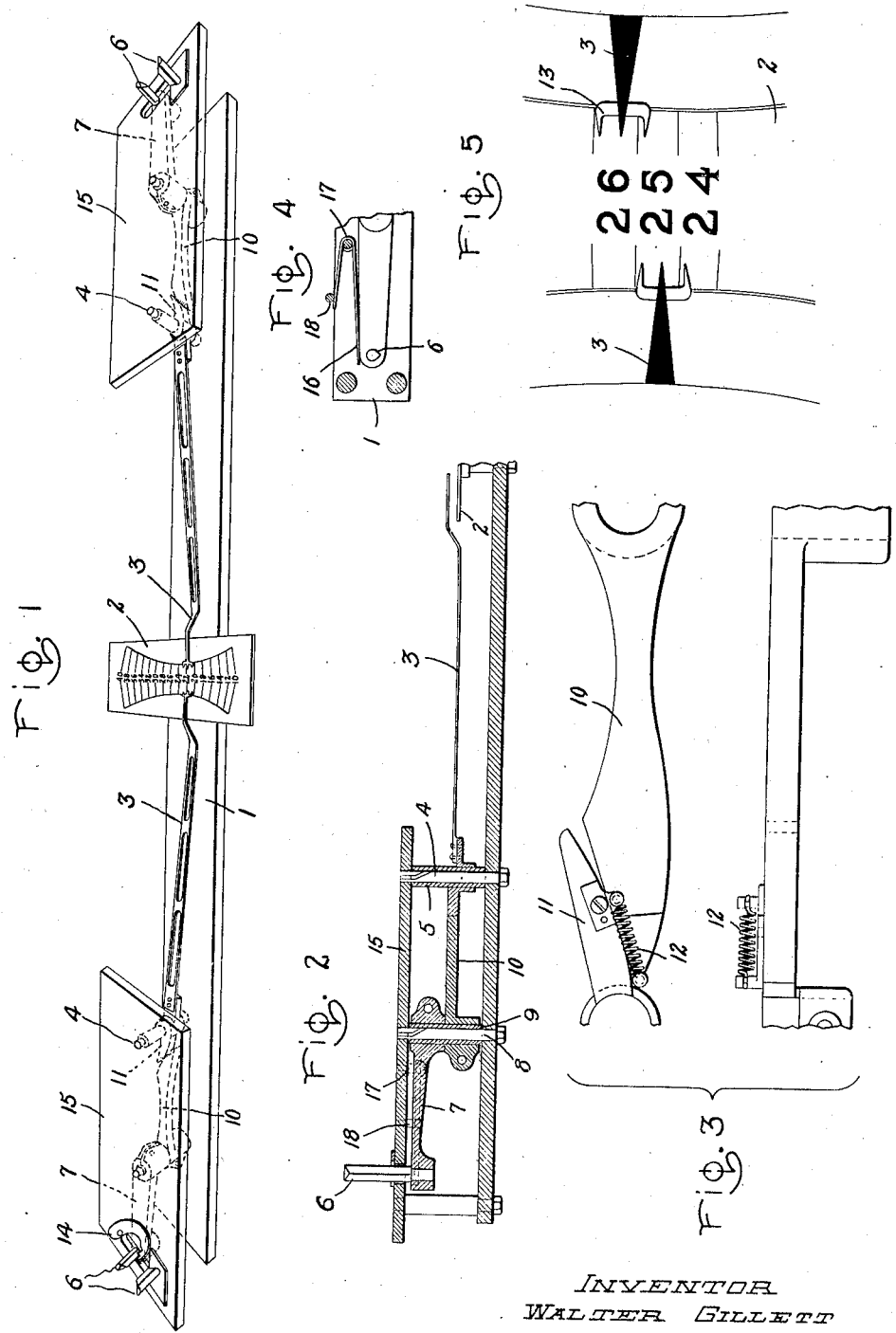
INVENTOR
WALTER GILLETT
BY
HIS ATTORNEY

UNITED STATES PATENT OFFICE.

WALTER GILLETT, OF EAST CLEVELAND, OHIO, ASSIGNOR TO GENERAL ELECTRIC COMPANY, A CORPORATION OF NEW YORK.

APPARATUS FOR MEASURING AND SORTING RODS.

1,344,941.

Specification of Letters Patent.  Patented June 29, 1920.

Application filed September 2, 1916. Serial No. 118,254.

*To all whom it may concern:*

Be it known that I, WALTER GILLETT, a subject of the King of Great Britain, residing at East Cleveland, county of Cuyahoga, State of Ohio, have invented certain new and useful Improvements in Apparatus for Measuring and Sorting Rods, of which the following is a specification.

My invention relates to an apparatus for measuring and assorting rods or similar articles, as glass tubing and cane or solid glass.

In the drawing of tubing and cane or solid glass the diameter can not be controlled with the desired accuracy, especially where the glass is drawn by hand. For instance, it has been found that the range of accuracy to be expected commercially is such that not over 85 per cent. of the drawn glass will be within plus or minus ($\pm$) 11 per cent. of the average diameter desired. For many purposes, especially in incandescent lamp making, glass of only one size for a given use may be used to advantage, and, consequently, in order to avoid waste due to scrapping off-size glass, it has been found economical and expedient to sort the cane and tubing into various sizes and use only one size at a time for a particular purpose. Formerly the steps between successive sizes were the same over a wide range so that the smaller glass of each group received more inaccurate measurements than the larger glass, as, for example, up to 8 mm. in diameter, steps were $\frac{1}{2}$ mm., and above 8 mm. in diameter the steps were 1 mm. A more consistent and satisfactory method of gaging is to make the diameter of each grade of glass a definite percentage of the diameter of the next preceding grade. I have designed my gage system in accordance with this principle, and since a permissible total range of glass in one group or grade in incandescent lamp making has been found to be approximately 7 per cent. of the diameter, I have conveniently made each step from one grade of glass to another to represent an increase in diameter of the glass of 7 per cent. in each case. For convenience, the factor 1.07174, which is the tenth root of 2, has been chosen, and by the use of this factor the diameter doubles every ten steps.

Following up this principle of measurement by which the glass is assorted into the various grades differing from each other by a definite percentage ratio of diameter, I have devised a construction which also provides for the simultaneous measuring of each end of the cane or tube section, the measurements of the two ends being so related and correlated to each other that the operator may determine at a glance,—first, to what grade the section being measured belongs; second, the variation in diameter between the two ends; third, whether the taper is excessive; and, fourth, which is the large end and which is the small end. Specifically, the apparatus comprises two gages each adapted to receive an end of a section of cane or tubing and an indicating device for indicating to the operator the taper of the section. The taper is determined by comparing the position of the indicating pointer on the left side of the indicator with that of the indicating pointer on the right side. Each of these pointers indicates the diameter at the corresponding end of the cane or tubing. The indicating device comprises a scale which is suitably divided up into a schedule of numbers or other indexes for indicating the various grades of glass. Preferably, the divisions or graduations on the scale are of equal dimensions throughout the scale, so that the divisions corresponding to the glass of smaller size represent smaller variations in the glass diameter as compared with the variation between graduations corresponding to larger sizes. This enables the measurements of small glass to be equally as accurate as the measurements of the larger glass.

For a better understanding of the invention reference may be had to the drawings accompanying this specification, Figure 1 of which is a perspective view of the operative parts of my measuring apparatus in assembled form; Fig. 2 is a sectional view of a portion thereof; Fig. 3 is an underside and side view showing a detail of the operating levers; Fig. 4 shows a detail of the movable gaging jaw and actuating spring, and Fig. 5 is an enlarged view of a section of the scale and pointers.

Referring to the drawings, the measuring apparatus as a whole is conveniently mounted on a base 1 running approximately the whole length of the apparatus. Approximately at the middle point of the base 1 is fixed a dial 2 upon which are described two opposed arcs of circles. These arcs are divided and calibrated in equal divisions, each division comprising one gage number and corresponding to one grade of glass. Lines are projected from one toward the other to make the two scales comparable, so that one column of figures serves for both. Each of these scales is traversed by an indicator 3, which is pivoted on a spindle 4 located at the center of the arcs of the circles described on the dial 2. The needles are directly attached and fixed to bronze sleeves 5, which are revolubly mounted on the spindles 4.

The apparatus comprises at either end a gage comprising two relatively movable, hardened steel jaws 6, between which jaws the cane or tubing is inserted to be measured. One of these jaws is illustrated as being stationary, while the other is mounted on the free end of a lever 7, the latter being pivoted to a spindle 8 fixed to the base 1. A sleeve of bronze 9 revolves on this spindle and carries the lever 7, and also carries a cam 10. Cam 10 operates with a cam 11 fixedly mounted on the indicator sleeve 5. These cams are maintained in rolling engagement with each other by means of a tension spring 12, one end of which is attached to a lug on cam 10, and the other end to a lug on cam 11, as illustrated. Upon inserting a section of glass between the jaws 6, the movable jaw and lever 7 operate the cam 10 and coöperating cam 11 to cause the indicator 3 to traverse the dial to indicate the diameter of the section.

The rolling cams are of such shape that the movable jaw 6 in opening conveys a gradually decreasing movement to the indicator, so that while the pointer moves over equal spaces between steps, the measuring jaws have an increasingly greater movement for each indicating space upon the dial as the diameter of the tubing increases. Thus, assuming the diameter of glass No. 24 to be 4.925 mm., the diameter corresponding to No. 25 is 5.278 mm., and that corresponding to 26 is 5.657 mm. in diameter, the diameter of succeeding grades being obtained by multiplying the diameter of the preceding grade by the factor 1.072, or more accurately, 1.07174. It is to be noted that the numbers in Fig. 5 do not bear quite the same relation to the divisions as in Fig. 1, but the arrangement in Fig. 5 is preferable.

The ends of the pointers or indicators carry supplementary points 13 which embrace one of the equal graduations. This is done for convenience in determining the taper of the glass, and in operation the bracketed space of one pointer must overlap the bracketed space of the other pointer to a certain extent in order for the glass to come within the limits to be used in practice. If too much taper exists in the glass article, the brackets are designed to be entirely outside of each other. Fig. 5 shows the relative position of the two pointers when the maximum allowable taper exists.

In order to save unnecessary wear on the machine and to facilitate and steady the operation, hooks 14, only one being shown, are provided on the machine to limit the movement of the operating parts of the indicating needle when engaging different sized cane and tubing. A hook 14 is pivoted on each of the plates 15, which are mounted upon and spaced from the base 1 by means of sleeves 4 and 9. The movable jaws 6 project up through slots provided in these plates, and the hook 14 has a number of notches for engaging the movable jaw and holding it in definite positions spaced from the stationary jaw against the tension of spring 16, which tends to urge the movable jaw toward the stationary gage. This spring 16 is carried on the under side of the plate 15 by means of a screw 17. The end of the spring engages the side of the lever 7 and urges the same in a counter clock-wise direction, while the other end engages an abutment 18 on the plate 15. The whole mechanism may be fixed in a suitable case, as of oak, having a glass panel covering the dial, this being omitted for convenience of illustration.

While my apparatus is particularly adapted for measuring and assorting cane glass and glass tubing, it is understood that articles of other than rounded contour may be measured with equal facility. The term "rod" as used in this specification is, therefore, intended to be general in meaning and is equally applicable to articles of circular, square and other cross sections.

What I claim and desire to secure by Letters Patent of the United States, is:—

1. An apparatus for determining the taper of rods or similar articles comprising a plurality of gages located at a fixed distance apart and each having a pair of jaws adapted to engage the said article on corresponding opposite points, a common indicating scale and means whereby the separation of the jaws of each gage is registered separately and simultaneously upon said common indicating scale.

2. An apparatus for determining the taper of rods or similar articles comprising two gages located at a fixed distance apart each having a pair of jaws adapted to engage the article, two indicating pointers each operatively connected to one of said gages, and a dial traversed simultaneously by said indicators whereby the dimensions at the different points may be determined and compared.

3. An apparatus for determining the taper of rods or similar articles comprising two sets of gaging jaws located at a fixed distance apart for receiving and engaging the exterior of an article at two isolated points along its length, the jaws of each set being relatively movable with respect to each other and operatively connected to an indicating pointer, and a common dial traversed simultaneously by said indicating pointer for indicating the relative separation of the said sets of jaws.

4. An apparatus for determining the taper of rods or similar articles comprising two sets of jaws located at a fixed distance apart, each set being located at a different point along the length of the article, the jaws of each set being relatively movable with respect to each other, and an indicating pointer for each of said sets and a common dial traversed simultaneously by the pointers and actuating mechanism between the jaws and the pointers which transmits relatively smaller movement to the pointers as the jaws become more widely separated.

5. An apparatus for determining the taper of rods or similar articles comprising two sets of gaging jaws located at a fixed distance apart for receiving and engaging an article at two isolated points along its length, an indicating pointer for each of said sets, a common dial traversed simultaneously by the pointers having equally spaced graduations thereon, and actuating mechanism between the jaws and the pointers comprising means whereby relatively smaller movements are transmitted to the pointers as the diameter of the tubing increases.

6. An apparatus for determining the taper of rods or similar articles comprising two sets of gaging jaws located at a fixed distance apart, each set being located at a different point along the length of the article, an indicator operatively connected with each of said sets, a common dial traversed by the indicators and having equally spaced graduations thereon, and actuating mechanism between the gages and indicators comprising means whereby the movements transmitted to the indicator as the diameter of the articles increases decrease progressively so that each succeeding graduation represents a diameter which is a definite percentage of the diameter represented by the preceding graduation.

7. An apparatus for determining the taper of rods or similar articles comprising a plurality of gages each located at a different point along the length of the article and each having a set of jaws for receiving and engaging the article, indicating pointers each operatively connected to one of said gages and adjustable means for limiting the movement of the gaging jaws toward each other.

8. In a device for measuring the diameter of a rod or similar article comprising a scale with equally spaced graduations thereon, two relatively movable gaging jaws adapted to receive the article and actuating devices between the movable jaws and an indicating device comprising means to transmit to the indicator smaller movements as the diameter of the articles increases.

9. An apparatus for determining the taper of rods comprising sets of jaws, each set being located at a different point along the length of the rod and being adapted to engage the same, a common indicating device and means connecting the same with the sets of jaws so that each set will simultaneously give a separate indication of the separation of its jaws.

In witness whereof I have hereunto set my hand this 31st day of August, 1916.

WALTER GILLETT.